(12) United States Patent
Dalmolen et al.

(10) Patent No.: US 8,944,361 B2
(45) Date of Patent: Feb. 3, 2015

(54) METHOD FOR HANDLING A FIBER REINFORCED PLASTIC TUBE, AND COMBINATION OF SUCH TUBE WOUND ON A REEL

(75) Inventors: Lambertus Gerrit Peter Dalmolen, Zaandam (NL); Peter Jeroen Cloos, Enkhuizen (NL)

(73) Assignee: Pipelife Nederland B.V., Enkhuizen (NL)

( * ) Notice: Subject to any disclaimer, the term of this patent is extended or adjusted under 35 U.S.C. 154(b) by 151 days.

(21) Appl. No.: 13/429,736

(22) Filed: Mar. 26, 2012

(65) Prior Publication Data
US 2012/0241547 A1     Sep. 27, 2012

(30) Foreign Application Priority Data

Mar. 24, 2011   (EP) ..................................... 11159523

(51) Int. Cl.
*B65H 18/14*    (2006.01)
*B65H 54/02*    (2006.01)
*B65H 49/18*    (2006.01)

(52) U.S. Cl.
CPC ................ *B65H 54/02* (2013.01); *B65H 49/18* (2013.01); *B65H 2701/332* (2013.01); *B65H 2701/3914* (2013.01)
USPC ................... 242/541.3; 242/532.5; 242/532.6

(58) Field of Classification Search
CPC .. B65H 54/585; B65H 18/22; B65H 2701/33; B65H 2701/332

USPC ......... 242/532.5, 541.3, 615.12, 615.2, 532.6
See application file for complete search history.

(56) References Cited

U.S. PATENT DOCUMENTS

| | | | | |
|---|---|---|---|---|
| 1,908,852 | A | * | 5/1933 | Lea ............................ 242/385.1 |
| 4,283,241 | A | | 8/1981 | Hollmann |
| 5,033,690 | A | * | 7/1991 | McIver ....................... 242/532.6 |
| 5,505,404 | A | * | 4/1996 | Dubreuil .................... 242/532.6 |
| 5,566,901 | A | * | 10/1996 | Wilder ........................ 242/532.6 |
| 6,027,066 | A | * | 2/2000 | Street .......................... 242/532.5 |
| 6,811,112 | B1 | * | 11/2004 | Currie et al. ............... 242/534.1 |
| 2002/0053389 | A1 | | 5/2002 | Martin et al. |
| 2002/0096592 | A1 | | 7/2002 | Chuang |

FOREIGN PATENT DOCUMENTS

| | | |
|---|---|---|
| EP | 0 856 694 A1 | 8/1998 |
| EP | 1 199 148 A1 | 4/2002 |
| EP | 1 787 794 A1 | 5/2007 |
| GB | 1 082 757 A | 9/1964 |
| JP | 4003781 A | 1/1992 |
| NL | 7900609 A | 7/1980 |

* cited by examiner

*Primary Examiner* — Sang Kim
(74) *Attorney, Agent, or Firm* — Young & Thompson

(57) ABSTRACT

A method for handling a fiber reinforced tube the tubular wall of which has a stiffness which allows the tube to maintain a nominal circular cross section of its own, the tube including a liner, a fiber reinforcement surrounding the liner and a coating surrounding the fiber reinforcement, includes the steps of:
flattening the tube so as to obtain a non-circular shape, such as an oval or elliptical shape,
subsequently winding the flattened tube onto a reel.
Thanks to the method, a combination of a wound flattened tube and a reel is obtained which is fit for road transport.

8 Claims, 3 Drawing Sheets

METHOD FOR HANDLING A FIBER REINFORCED PLASTIC TUBE, AND COMBINATION OF SUCH TUBE WOUND ON A REEL

BACKGROUND OF THE INVENTION

The invention is related to the field of fiber reinforced plastic tubes. Depending on the nature of the fibers applied, such tubes usually have a high strength. For instance, polyester fibers make the tubes in question suitable for the transport of high pressure liquids and gasses. Examples thereof are crude oil and natural gas, which may comprise aggressive components. Such components may be detrimental to steel pipes, for which reason it is desirable to use fiber reinforced tubes having a proper liner which can withstand the aggressive nature of such fluids.

The strength of the tube therefore depends heavily on the fiber reinforcement. As mentioned, the tubes comprise an inner liner so as to convey the fluids. Onto the liner, the fiber reinforcement layer is applied, and finally the coating layer is applied onto the fiber reinforcement layer. This fiber reinforcement layer may be carried out in various shapes. As an example, the fiber reinforcement layer may be a braided layer. Alternatively, the fibers may be embedded in a tape which is wound around the liner according to a helical shape. Also, the fibers may be wound onto the liner according to various plies and winding angles.

Due to the nature of the plastics and the fibers used, the tube has a stiff character in such a way that it maintains its circular shape, also when exposed to moderate external pressure loading. Depending on the diameter of the tube, this stiffness will resist the bending of the tube to a greater or lesser extent. Generally, it is still feasible to wind a tube of relatively small cross sectional diameter onto a reel, the diameter of which however must not be too small as otherwise the tube will buckle or kink while being wound onto the reel.

The step of winding the tubes on a reel is highly desirable having regard to the fact that it is thereby made possible to supply a great uninterrupted tube length. Tubes of a great length have the advantage that relatively few couplings need to be made to make up a complete trajectory, which is beneficial for both the reliability of such trajectory and for limiting the cost thereof. It will however be clear that the maximum dimensions of reel with a tube wound thereon are limited, having regard to the requirements which are imposed when using road transport. As a tube of relatively large cross sectional diameter has by its very nature a high resistance against bending, it is hardly feasible to wind such tube onto a reel which, in view of road transport, has moderate dimensions. This means that a tube with relatively large diameter is usually supplied in straight sections of limited length. As mentioned, this has disadvantages both in view of the cost of the trajectory obtained and the cost thereof.

SUMMARY OF THE INVENTION

The object of the invention is therefore to enable the supply of relatively great lengths of a fiber reinforced tube of moderate up to large diameters, while maintaining the possibility of transport efficiency, such as road transport. This object is obtained by a method for handling a fiber reinforced tube the tubular wall of which has a stiffness which allows the tube to maintain a nominal circular cross section of its own, said tube comprising a liner, a fiber reinforcement surrounding the liner and a coating surrounding the fiber reinforcement, comprising the steps of:

flattening the tube so as to obtain a non-circular shape, such as an oval or elliptical shape,
subsequently winding the flattened tube onto a reel.

It appears that the tube, despite its stiff character, is still capable of being compressed so as to obtain a flattened shape. The tube may nevertheless maintain its integrity, despite the formation of possible longitudinal folds in the wall thereof. However, the formation of longitudinal folds, if any, depends on the amount of compression applied. After flattening, the tube has relatively little resistance against bending, which has the advantage is that the tube may be wound onto a reel, even in case the original circular tube was of a relatively large diameter. The risk of kinking or buckling is greatly diminished, having regard to the fact that a flattened tube has a relatively low bending stiffness. The flattened shape has the further advantage that it allows more windings to be accommodated onto the reel, for a given maximum outer diameter of the combination of reel and wound tube.

In this connection, a distinction should be made between the tubes in question with which the invention is concerned and so-called hoses. A hose does not have a wall which provides a stiffness which could make the hose to maintain a circular shape. Instead, a hose is of a very flexible nature and collapses as soon as an internal overpressure is relieved. Thereby, a hose can be readily wound onto a reel as it has already, by its very nature, a flattened shape.

The step of flattening the tube may be carried out in several ways, and may for instance directly be carried out after manufacturing the tube. Preference is given to the steps of:
providing a pair of opposed pressure members,
flattening the tube between the pressure members.
For instance this method may comprise the steps of
applying a pair of opposed caterpillars the facing parts of which enclose a nip of predetermined magnitude,
selecting a nip magnitude which is smaller than the outer diameter of the tube,
making the facing parts of the caterpillars carry out a movement in the same direction,
guiding the tube between the facing parts of the caterpillars by the movement of the caterpillars while flattening the tube.

The facing parts of the caterpillars provide a stable support for the tube, in such a way that said tube can be flattened in a stable and reliable manner. However, the tube may alternatively be flattened by the steps of:
applying a pair of opposed rollers which enclose a nip,
selecting a nip magnitude which is smaller than the outer diameter of the tube.

According to a further alternative, the method may comprise the steps of;
applying a funnel having opposed inner sliding surfaces and defining an inlet end and an outlet end,
selecting a first distance between the opposed inner sliding surfaces with a magnitude larger than the outer diameter of the tube,
selecting a second distance between the opposed inner sliding surfaces with a magnitude smaller than the outer diameter of the tube.

The sliding surfaces may be provided with a low friction coating, so as to enable the tube to slide through the funnel with low resistance while being flattened.

Preferably, the rotational axes of the caterpillars or rollers are generally parallel to the axis of the reel. Preferably, the nominal diameter of the tube is larger than 75 mm. Furthermore, the ratio of the wall thickness of the tube over the outer diameter thereof may be larger than 5% and preferably smaller than 15%. The amount of flattening of the tube, expressed as the ratio of the nominal diameter of the circular tube and the maximal thickness of the flattened tube, said thickness being measured in the direction of flattening, may be at least 3. The ratio of the minimal radius of curvature of the wound tube and the diameter of the circular tube may be smaller than 15, preferably smaller than 10.

After the reel with the wound tube has been delivered at a specified location, the following steps may be carried out:
  unwinding the flattened tube from the reel,
    making the tube regain the circular nominal cross section thereof.

In particular, the tube may regain the circular nominal cross section thereof by increasing the internal pressure thereof in comparison to the pressure outside the tube. After the pressure is relieved, the tube with its resumed circular shape is self supporting again, and is able to maintain said circular shape against external pressure loadings, gravity and the like.

The invention is furthermore related to the combination of a reel and a flattened tube wound onto the reel by the method addressed before. The amount of windings of the flattened tube on the reel may be at least 2.

The tube may be carried out with different materials, provided that a certain level of elasticity is ensured so as to enable the flattening deformations of the tube. These deformations may be completely elastic, in such a way that the tube may regain the perfect original circular shape again. However, the invention is not limited to such fully elastic deformations. It may also be possible to deform the tube to such an extent that plastic deformations occur, that is deformations which leave a lasting trace in the tube.

Preference is given to a liner material comprising (high density) polyethylene (HDPE), polyamides like polyamide 11 or polyamide 12, polyvinylidenedifluoride (PVDF), polypropylene (PP) or other thermoplastic resin. The reinforcement layer preferably comprises a ductile or thermoplastic fiber, such as polyester fiber, nylon fiber, polyamide fiber. Alternatively, the reinforcement layer may comprise a steel reinforcement, such as steel fiber, steel cord or steel strips.

BRIEF DESCRIPTION OF THE SEVERAL VIEWS OF THE DRAWINGS

The invention will now be described further with reference to the drawings.

DETAILED DESCRIPTION OF THE INVENTION

Figure 1:
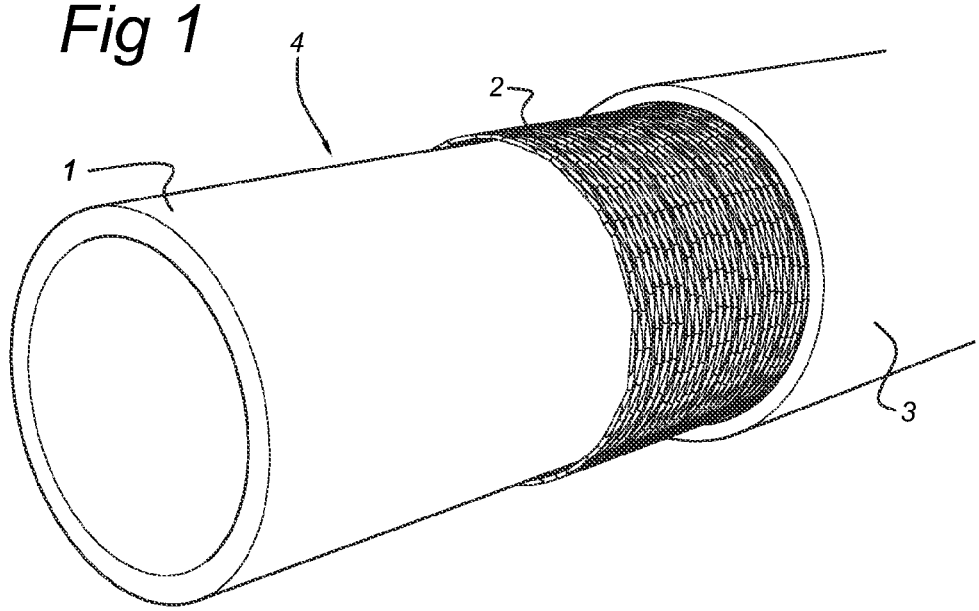
FIG. 1 shows a sectional view of a tube in perspective.
Figure 2:
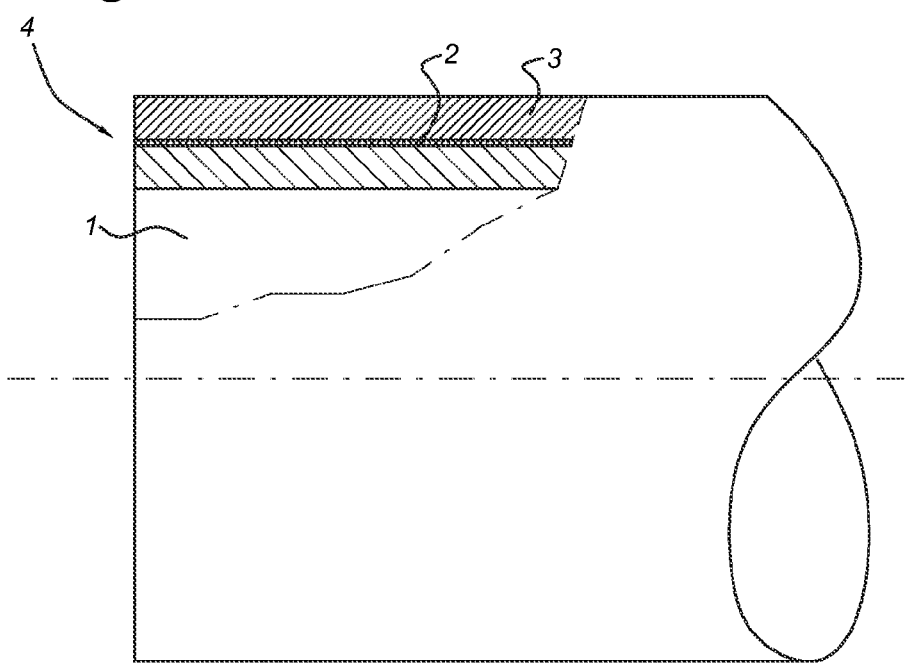
FIG. 2 shows a longitudinal section through the wall of the tube of FIG. 1.

The tube 4 as shown in FIGS. 1 and 2 consists of a liner 1 with a nominal inner diameter which defines the flow capacity of the tube. The liner is of a material which is selected on the basis of the fluid to be transported, and in any case should be chemically inert with respect to such fluid. Around the liner, the reinforcement layer 2 has been applied. The purpose of this reinforcement layer is to provide resistance against the pressure of the fluids within the liner. For instance, the pressure of the fluid transported may be in the order of magnitude of 50-100 bar, as is the case in certain applications in the field of hydrocarbon transport, e.g. crude oil and natural gas. As usual, a coating layer covers the reinforcement layer 2. The purpose of this coating layer is to protect the reinforcement layer against mechanical influences, weathering etc.

Due to the fact that the several layers, in particular the liner and the reinforcement layer, serve completely different purposes, the materials used for these layers are different as well. As a result, the layers in question do not adhere to each other as the materials thereof are usually chemically incompatible. Thus, the liner is able to settle somewhat with respect to the reinforcement layer. In fact, the behavior of the layers under bending deformations of the tube could be regarded as being independent from each other. This phenomenon plays an important role upon bending the tube, such as occurs while winding the tube onto a reel.

Figure 3:
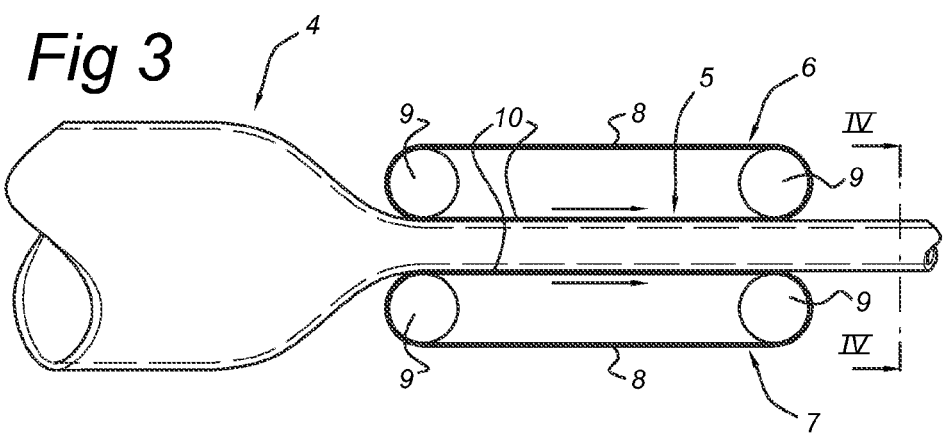
FIG. 3 shows the step of flattening the tube.
Figure 4:
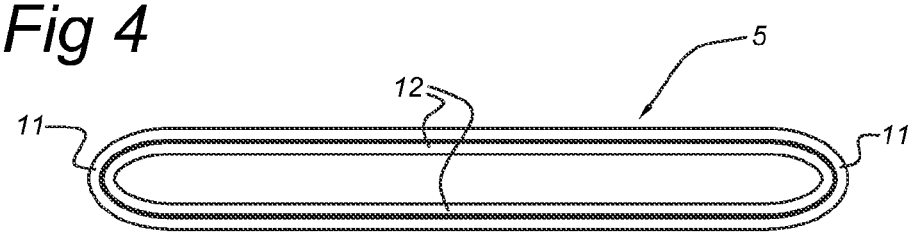
FIG. 4 shows the step of winding the flattened tube onto a reel.

The tube 4 according to the invention is therefore not to be wound directly onto a reel. In a first step, as shown in FIG. 3, the tube 4 is compressed into a flattened shape 5, in the embodiment shown between two caterpillars 6, 7, each of these caterpillars comprises a belt without end 8, guided around the rollers 9 which are driven in rotation by a drive source such as an electric motor and gear box (not shown). The caterpillars 6, 7 have facing parts 10 which move in the same direction as indicated by the arrows. Due to the fact that the nip as defined between the facing parts 10 of the caterpillars 6, 7 is smaller than the original diameter of the tube 4, the flattened shape 5 is formed when the tube 4 is driven through the nip. The flattened tube is shown in cross section in FIG. 4, having relatively sharp curved parts 11 and flat parts 12. The cross sectional shape may also be oval or elliptic; it is even possible to have a shape according to which the flat parts are pressed onto and against each other.

Figure 5:
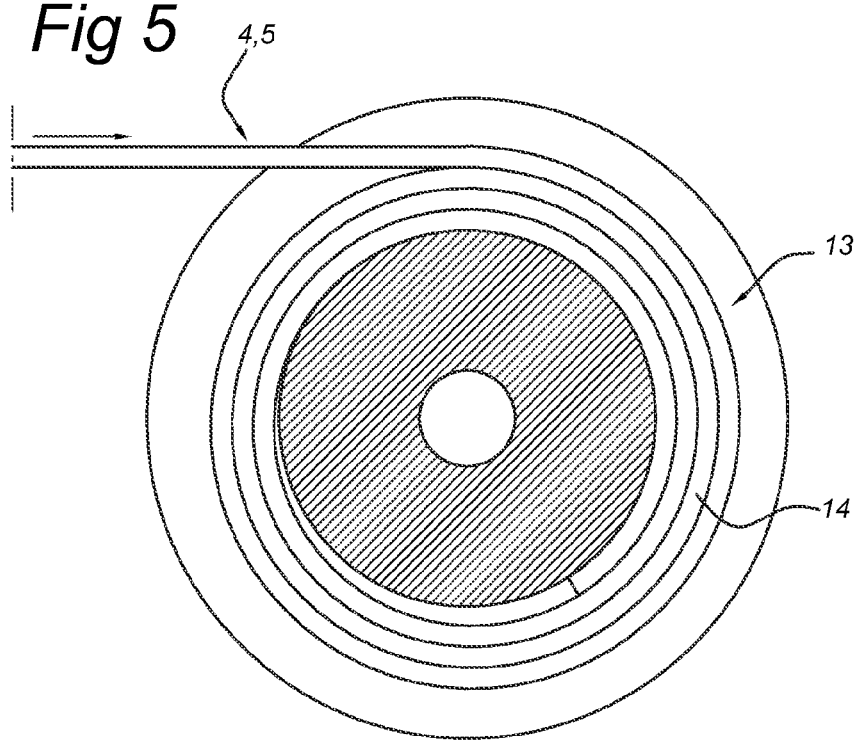
FIG. 5 shows a sectional view of the reel and wound tube.
Figure 6:
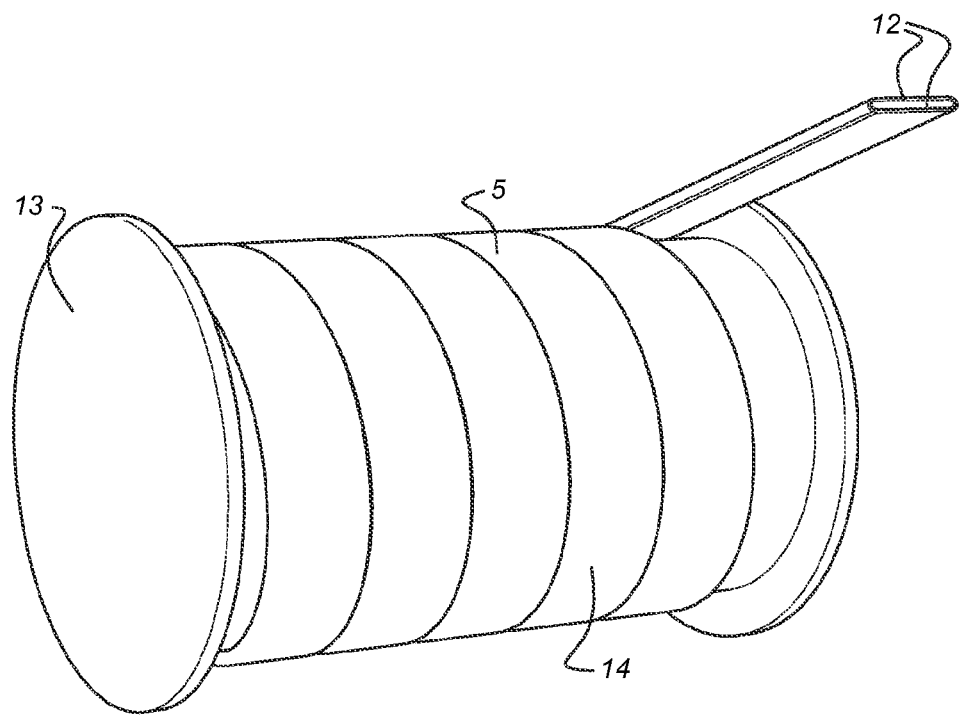
FIG. 6 shows a front view of the reel and wound tube.

Once flattened, the tube 4, 5 is wound onto a reel 13 as shown in FIGS. 5 and 6. The axis of this reel 13 is parallel to the axes of the rollers 9 around which the caterpillars 6, 7 are guided. The tube may be wound according to multiple windings 14 which are arranged next to (FIG. 6) and onto (FIG. 5) each other. Due to the fact that the tube is flattened, the flattened part 5 may follow the curvature of the reel 13 more readily than a tube having a circular cross section. Furthermore the advantage is obtained that a large amount of flattened part windings may be accommodated on the reel without the diameter of the reel with wound tube becoming unduly large.

The invention claimed is:

1. A method for handling a fiber reinforced tube a tubular wall of which has a stiffness that allows the tube to maintain a substantially circular cross section,
  said method comprising:
    flattening the tube between a pair of opposed pressure members so as to obtain a less substantially circular cross section, such that a width of the cross section is larger than a thickness of the cross section; and
    subsequently winding the flattened tube onto a reel, wherein a direction of the width of the cross section is parallel to an axis of the reel; wherein said flattening comprises:
      applying a pair of opposed caterpillars, facing parts of which enclose a nip of predetermined magnitude that is smaller than an outer diameter of the tube;
      making the facing parts of the caterpillars carry out a movement in a same direction; and
      guiding the tube between the facing parts of the caterpillars, by the movement of the caterpillars, while flattening the tube,
  wherein said tube comprising a liner, a fiber reinforcement surrounding the liner, and a coating surrounding the fiber reinforcement.

2. The method according to claim 1, comprising:
orienting rotational axes of the caterpillars generally parallel to the axis of the reel.

3. The method according to claim 1, wherein the outer diameter of the tube is larger than 75 mm.

4. The method according to claim 1, wherein a ratio of a wall thickness of the tube over the outer diameter thereof is larger than 5% and smaller than 15%.

5. The method according to claim 1, wherein an amount of flattening of the tube, expressed as the ratio of the diameter of the circular tube and a maximal thickness of the flattened tube, said thickness being measured in a direction of flattening, is at least 3.

6. The method according to claim 1, wherein a ratio of a minimal radius of curvature of the wound tube to a diameter of the circular tube is smaller than 15.

7. The method according to claim 1, comprising:
unwinding the flattened tube from the reel,
making the tube regain the substantially circular cross section thereof.

8. The method according to claim 7, comprising:
making the tube regain the substantially circular cross section thereof by increasing an internal pressure thereof in comparison to a pressure outside the tube.

* * * * *